(12) United States Patent
Zhang

(10) Patent No.: US 12,466,707 B1
(45) Date of Patent: Nov. 11, 2025

(54) STABILIZER FOR RECREATIONAL VEHICLE

(71) Applicant: Jianping Zhang, Guangdong (CN)

(72) Inventor: Jianping Zhang, Guangdong (CN)

( * ) Notice: Subject to any disclaimer, the term of this patent is extended or adjusted under 35 U.S.C. 154(b) by 0 days.

(21) Appl. No.: 19/021,232

(22) Filed: Jan. 15, 2025

(30) Foreign Application Priority Data

Jan. 8, 2025 (CN) .......................... 202520044701.9

(51) Int. Cl.
| | |
|---|---|
| *F16M 11/20* | (2006.01) |
| *B66F 3/02* | (2006.01) |
| *B66F 3/10* | (2006.01) |
| *F16M 11/28* | (2006.01) |
| *F16M 11/34* | (2006.01) |
| *F16M 11/04* | (2006.01) |
| *F16M 11/24* | (2006.01) |

(52) U.S. Cl.
CPC .............. *B66F 3/02* (2013.01); *F16M 11/28* (2013.01); *F16M 11/34* (2013.01); *B66F 3/10* (2013.01); *F16M 11/046* (2013.01); *F16M 11/245* (2013.01); *F16M 2200/028* (2013.01)

(58) Field of Classification Search
CPC ...... F16M 11/18; F16M 2200/028; B66F 1/06
USPC ........... 248/352, 171, 161, 170, 188.5, 169; 254/108; D34/31; 182/153
See application file for complete search history.

(56) References Cited

U.S. PATENT DOCUMENTS

| | | | | |
|---|---|---|---|---|
| 1,234,510 | A * | 7/1917 | Trautwein | F16M 11/28 182/153 |
| 2,598,753 | A * | 6/1952 | Bolsey | F16M 11/34 248/171 |
| 3,061,343 | A * | 10/1962 | Doyle | G10G 5/00 403/329 |
| 3,064,932 | A * | 11/1962 | Holderman | F16M 11/18 248/188.5 |
| 3,697,031 | A * | 10/1972 | Glickman | F16M 11/34 248/171 |
| 5,062,606 | A * | 11/1991 | Hoshino | F16M 11/28 248/169 |

(Continued)

FOREIGN PATENT DOCUMENTS

| | | | | |
|---|---|---|---|---|
| CN | 106904562 | A * | 6/2017 | |
| CN | 108224028 | A * | 6/2018 | ........... F16M 11/043 |

(Continued)

OTHER PUBLICATIONS

CBM Tech (found at: https://www.amazon.com/live/video/01d28fa1738246d182d2277288d3e301?ref_=dp_vse_ibvc0 ) (Year: 2025).*

*Primary Examiner* — Mahdi H Nejad

(74) *Attorney, Agent, or Firm* — S.J. Intellectual Property LTD.

(57) ABSTRACT

A stabilizer for a recreational vehicle includes a first support structure, a second support structure, and a locking mechanism. The first support structure includes an outer tube. The second support structure includes a casing, side support bars, and connecting rods. The casing selectively moves in a first direction of a first end of the outer tube or in a second direction of a second end of the outer tube. The locking structure includes a first limit member and a second limit member. The second limit member is selectively abutted against the first limit member, so as to lock a degree of freedom of the casing in the first direction.

18 Claims, 21 Drawing Sheets

(56) References Cited

U.S. PATENT DOCUMENTS

| | | | | |
|---|---|---|---|---|
| 5,180,131 | A * | 1/1993 | Few | F16M 11/18 254/108 |
| 5,421,555 | A * | 6/1995 | Sims | B60D 1/665 254/420 |
| 5,934,628 | A * | 8/1999 | Bosnakovic | F21V 21/06 248/169 |
| 7,195,377 | B2 * | 3/2007 | Tsai | F16M 11/245 362/427 |
| 8,141,827 | B2 * | 3/2012 | Lin | F16M 11/242 248/170 |
| 8,246,011 | B1 * | 8/2012 | Fox, III | B60D 1/66 254/420 |
| 9,330,645 | B2 * | 5/2016 | Sawhney | F16M 11/245 |
| 9,663,016 | B1 | 5/2017 | Sutton | |
| 10,612,720 | B2 * | 4/2020 | Lin | G03B 17/561 |
| 10,738,938 | B2 * | 8/2020 | Becker | F16M 11/36 |
| 2005/0051682 | A1 | 3/2005 | Tuohy et al. | |
| 2007/0144083 | A1 | 6/2007 | Angelo | |
| 2007/0223239 | A1 * | 9/2007 | Thompson | F21L 14/02 362/399 |
| 2008/0078914 | A1 * | 4/2008 | Liao | G10D 13/28 248/435 |
| 2010/0258775 | A1 * | 10/2010 | Zhengwei | B66D 1/04 254/93 H |
| 2010/0264384 | A1 * | 10/2010 | Realegeno-Amaya | B66D 1/08 254/93 H |
| 2011/0278404 | A1 * | 11/2011 | Hanlon | B66F 1/06 248/161 |

FOREIGN PATENT DOCUMENTS

| | | | | |
|---|---|---|---|---|
| CN | 212617357 | U * | 2/2021 | |
| CN | 119062869 | A * | 12/2024 | |
| GB | 2108835 | A * | 5/1983 | D06F 57/04 |

* cited by examiner

STABILIZER FOR RECREATIONAL VEHICLE

CROSS REFERENCE TO RELATED APPLICATIONS

This application claims priority benefits to Chinese Patent Application No. 2025200447019, filed on Jan. 8, 2025; the contents of which are incorporated herein by reference.

TECHNICAL FIELD

Embodiments of the present disclosure relate to a stabilizer for a recreational vehicle.

BACKGROUND

A stabilizer is a support structure which has better load-bearing performance and stability. In order to adapt to various heights, many stabilizers also have the function of height adjustment.

SUMMARY

An embodiment of the present disclosure provides a stabilizer for a recreational vehicle to solve at least one technical problem in the related art.

A stabilizer for a recreational vehicle, including a first support structure, a second support structure, and a locking mechanism, where: the first support structure includes an outer tube; the second support structure includes: a casing, slidably sleeved to an outer side of the outer tube; at least three side support bars, a first end of each of the at least three side support bars being hinged with an outer wall of the casing respectively; and at least three connecting rods, one end of each of the at least three connecting rods being hinged with a second end of the outer tube, and the other end of each of the at least three connecting rods being hinged with the side support bars; where the casing selectively moves in a first direction of a first end of the outer tube or in a second direction of the second end of the outer tube, so as to adjust the height of the stabilizer; and the locking mechanism includes: a first limit member, fixedly provided on an outer wall of the outer tube in a length direction of the outer tube; a housing, fixedly connected to the outer wall of the casing; and a second limit member, confined to and movably connected to the housing; where the second limit member is selectively abutted against the first limit member, so as to lock a degree of freedom of the casing in the first direction.

BRIEF DESCRIPTION OF DRAWINGS

The accompanying drawings of the specification forming part of the present disclosure are used to provide a further understanding of the present disclosure, and the schematic embodiments of the present disclosure and the description thereof are used for the purpose of explaining the present disclosure and do not constitute an undue limitation of the present disclosure.

Figure 1:
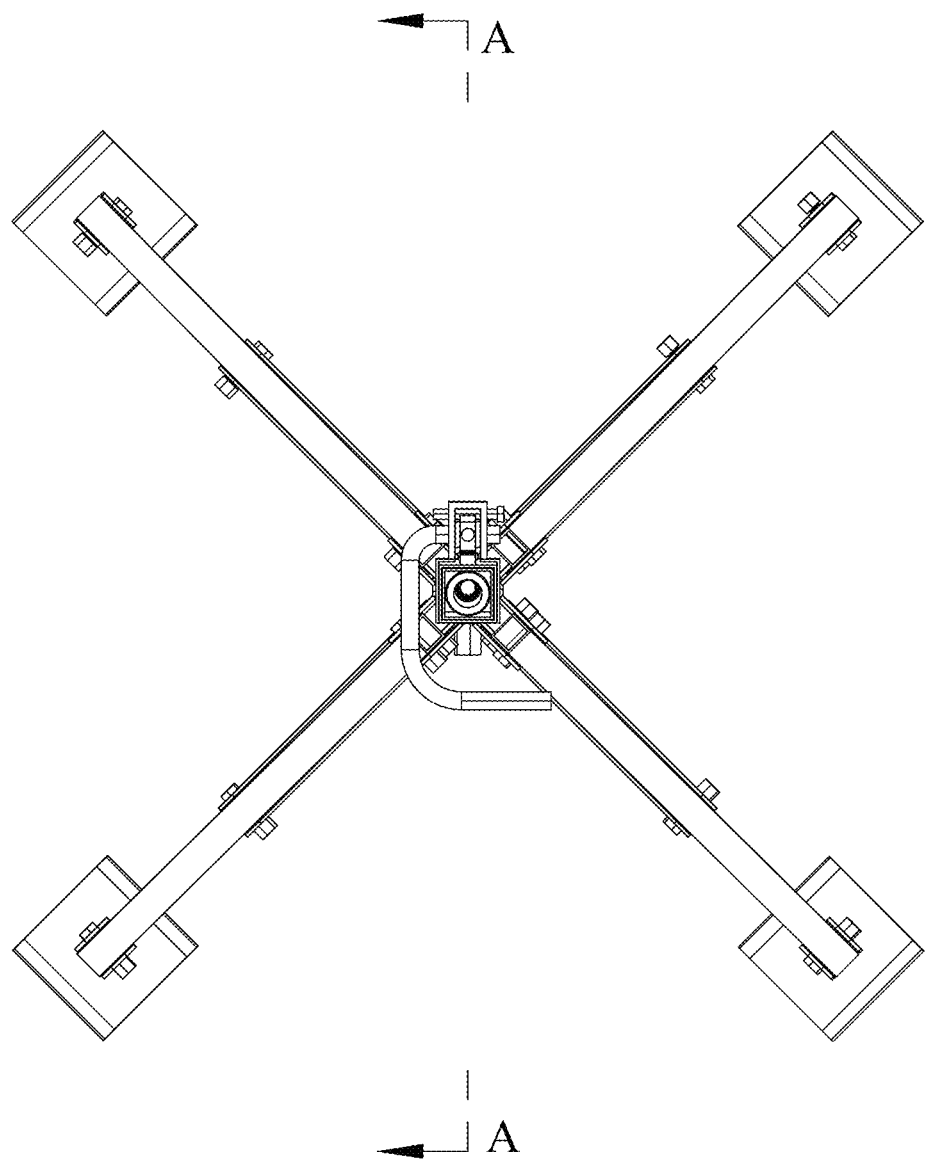
FIG. 1 is a top view of a stabilizer according to an embodiment of the present disclosure.

Reference numerals: 10—first support structure; 101—outer tube; 102—inner tube; 1021—slider; 1022—threaded hole; 103—threaded rod; 1031—limit block; 1032—fixing block; 1033—first gear; 1041—drive shaft; 1042—second gear; 20—second support structure; 201—side support bar; 202—casing; 203—connecting rod; 204—foot; 31—first locking mechanism; 3100—rack; 3101—housing; 3102—convex tooth; 3103—toggle plate; 3104—rotating shaft; 3105—latch; 3106—handle; 3107—first locking pin; 3108—opening; 3109—front side; 3110—back side; 3111—tooth groove; 3112—limit end; 3113—first pin hole; 32—second locking mechanism; 3201—housing; 3203—strip hole; 3204—second locking pin; 3205—notch; 3206—limit slot; 3207—second pin hole; 3208—limit plate; 3209—limit hole; 33—third locking mechanism; 3301—first housing; 3302—third pin hole; 3303—third locking pin; 3304—latch; 3305—handle; 3306—second housing; 3307—channel; 3308—cover; 3309—limit ring; 3310—spring; 3311—fourth pin hole; 41—first connecting member; 42—second connecting member.

DETAILED DESCRIPTION

The present disclosure will be described in detail below with reference to the accompanying drawings and in conjunction with embodiments. The various examples are provided by way of explanation of the present disclosure and are not intended to limit the present disclosure. Actually, it will be clear to those skilled in the art that modifications and variations may be made in the present disclosure without departing from the scope or spirit of the present disclosure. For example, features shown or described as part of one embodiment may be used in another embodiment to produce yet another embodiment. Thus, it is expected that the present disclosure encompasses such modifications and variations that are categorized within the scope of the appended claims and their equivalents.

In the description of the present disclosure, orientation or positional relationships indicated by the terms "longitudinal", "transverse", "up", "down", "forward", 'back', 'left', 'right', "vertical", "horizontal", "top", "bottom", etc. are based on the orientation or positional relationships shown in the accompanying drawings, and are intended solely for the purpose of facilitating the description of the present disclosure rather than requiring that the present disclosure be constructed and operated in a particular orientation, which, therefore, cannot be construed as limiting the present disclosure. The terms "connected", "connecting", and "provided" used in the present disclosure are to be understood in a broad sense, e.g., as a fixed connection or a detachable connection; a direct connection or an indirect connection through an intermediate part; a wired electrical connection, a radio connection, or a wireless communication signal connection. Those of ordinary skill in the art can understand the specific meaning of the above terms in the light of the circumstances.

One or more examples of the present disclosure are illustrated in the accompanying drawings. Numerical and alphabetic marks are used in the detailed description to refer to features in the accompanying drawings. Similar or analogous marks in the accompanying drawings and description have been used to refer to similar or analogous portions of the present disclosure. As used herein, the terms "first," "second," "third", etc. are used interchangeably to distinguish one component from another and are not intended to indicate locations or importance of individual components.

Figure 2:
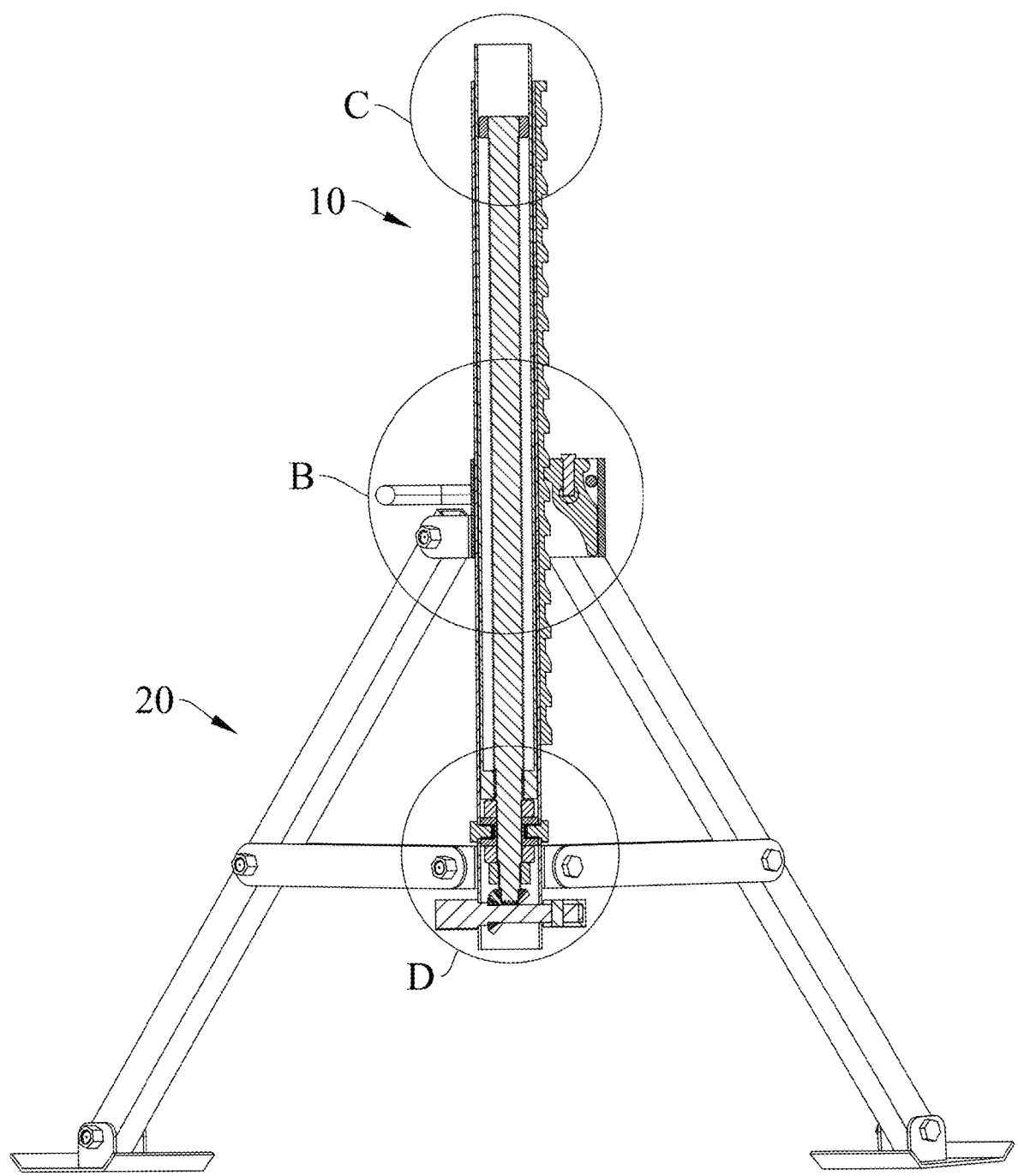
FIG. 2 is a sectional view in a direction AA of FIG. 1.
Figure 3:
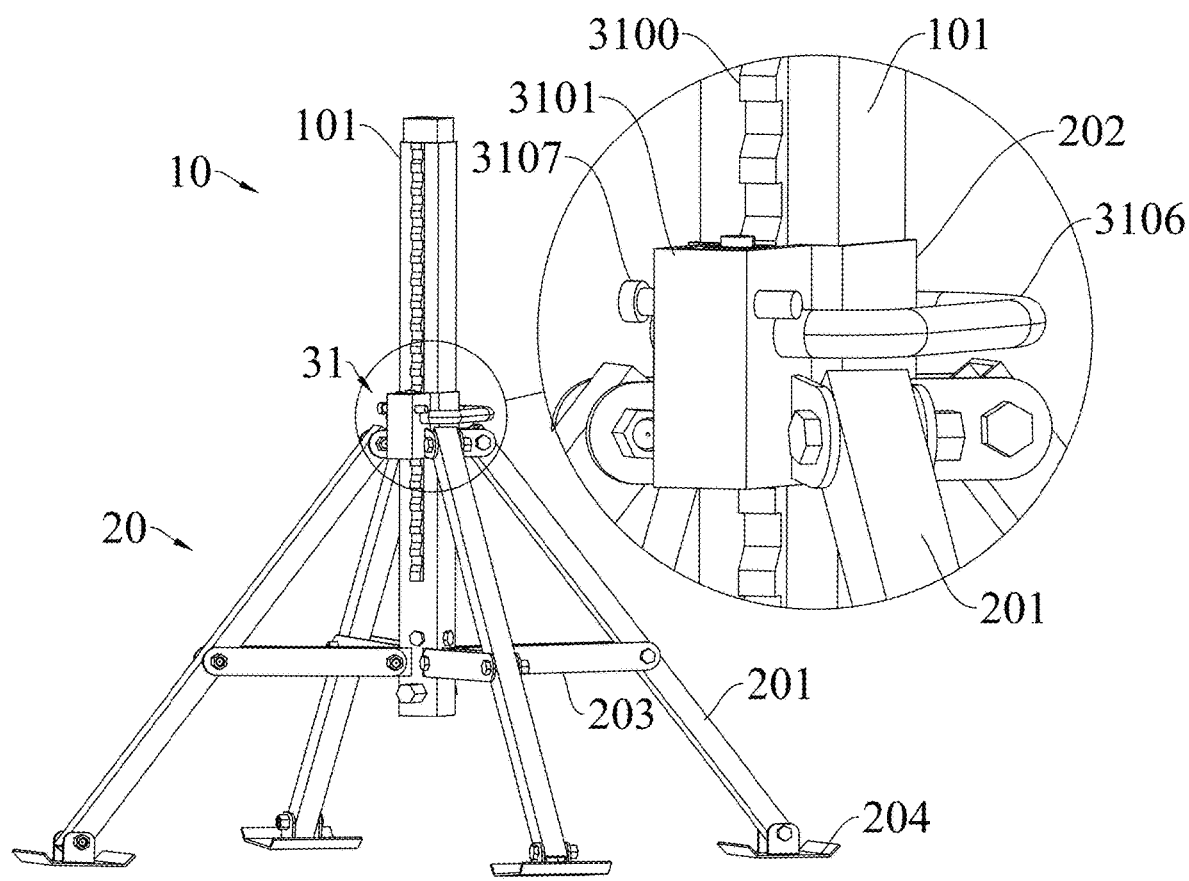
FIG. 3 shows a perspective and a partially enlarged view of a stabilizer according to an embodiment of the present disclosure.

As shown in FIGS. 1 to 3, a stabilizer for a recreational vehicle is provided according to an embodiment of the present disclosure. The stabilizer includes a first support structure 10 and a second support structure 20. The second support structure 20 includes at least three side support bars 201, and there are four side support bars 201 provided in this embodiment. The first support structure 10 includes an outer tube 101. A casing 202 is sleeved to an outer side of the outer tube 101, and the casing 202 can reciprocate in a length direction of the outer tube 101. The four side support bars 201 are disposed around the outer tube 101. A first end of each of the four side support bars 201 is hinged with an outer wall of the casing 202 respectively, and a second end of each of the four side support bars 201 is supported on the ground or a support carrier. The second support structure 20 also includes connecting rods 203, and each of the side support bars 201 corresponds to at least one connecting rod 203. A first end of each of the connecting rods 203 is hinged between the first end and the second end of a respective side support bar 201, and a second end of each of the connecting rods 203 is hinged to a second end of the outer tube 101 or a position proximal to the second end of the outer tube 101. The first support structure 10 and the second support structure 20 are coupled to each other during the height adjustment of the stabilizer. In some embodiments, the outer tube 101 is provided with a first end opposite to the second end thereof in direction. The stabilizer is gradually lowered when the casing 202 is proximal to the first end of the outer tube 101, which is defined herein as the movement of the casing 202 in a first direction, defining the direction as the first direction; conversely, the stabilizer is gradually raised when the casing 202 is proximal to the second end of the outer tube 101, which is defined herein as the movement of the casing 202 in a second direction, defining the direction as the second direction. In some embodiments, the second end of each of the side support bars 201 is also provided with feet 204 to improve the stability of the stabilizer when in use.

Relatively speaking, the height of the stabilizer is limited by the distance between the casing 202 and the second end of the outer tube 101 in the above embodiment. Certainly, the angle at which the side support bars 201 open outwardly also affects the height of the stabilizer, but is still limited by the distance between the casing 202 and the second end of the outer tube 101. Therefore, it is necessary to lock at least the degree of freedom of the casing 202 in the first direction after the height of the stabilizer is set, so that the casing 202 cannot move in the first direction, thereby ensuring that the stabilizer cannot be lowered when locked.

In order to solve the problem of locking, the stabilizer is provided with a locking structure including a first limit member and a second limit member. The first limit member is provided on an outer wall of the outer tube 101 in the length direction of the outer tube 101, and the second limit member is confined to the outer side of the casing 202 through a housing. The housing is fixedly connected to the outer wall of the casing 202. The second limit member can move within the housing to allow the second limit member to be selectively abutted against the first limit member and to lock the degree of freedom of the casing 202 in the first direction.

As shown in FIGS. 3 to 7, in some embodiments, the present disclosure discloses a first locking mechanism 31 including a rack 3100 which is fixedly provided on the outer wall of the outer tube 101 in the length direction of the outer tube 101. A tooth portion of the rack 3100 faces away from the outer wall of the outer tube 101. The tooth portion of the rack 3100 includes several convex teeth 3102. The convex teeth 3102 include front sides 3109 facing the second end of the outer tube 101 and back sides 3110 facing away from the second end of the outer tube 101. A tooth groove 3111 is provided between every two convex teeth 3102. A wall of the casing 202 is provided with an opening 3108 which is defined along the length of the outer tube 101. The rack 3100 can extend into the opening 3108 and move in its length direction. The outer wall of the casing 202 is fixedly provided with a housing 3101 which is provided with a cavity, and the opening 3108 of the casing 202 is in communication with the cavity of the housing 3101. A toggle plate 3103 is provided in the cavity of the housing 3101. The toggle plate 3103 is rotationally connected to the housing 3101 by means of a rotating shaft 3104, and includes a latch 3105 and a limit end 3112. The latch 3105 and the limit end 3112 are separately disposed at two sides of the rotating shaft 3104, where the latch 3105 faces the opening 3108 of the casing 202. If the toggle plate 3103 rotates, the latch 3105 selectively moves closer to or farther away from the opening 3108 of the casing 202, and the limit end 3112 also moves closer to or farther away from an inner wall of the housing 3101

Figure 6:
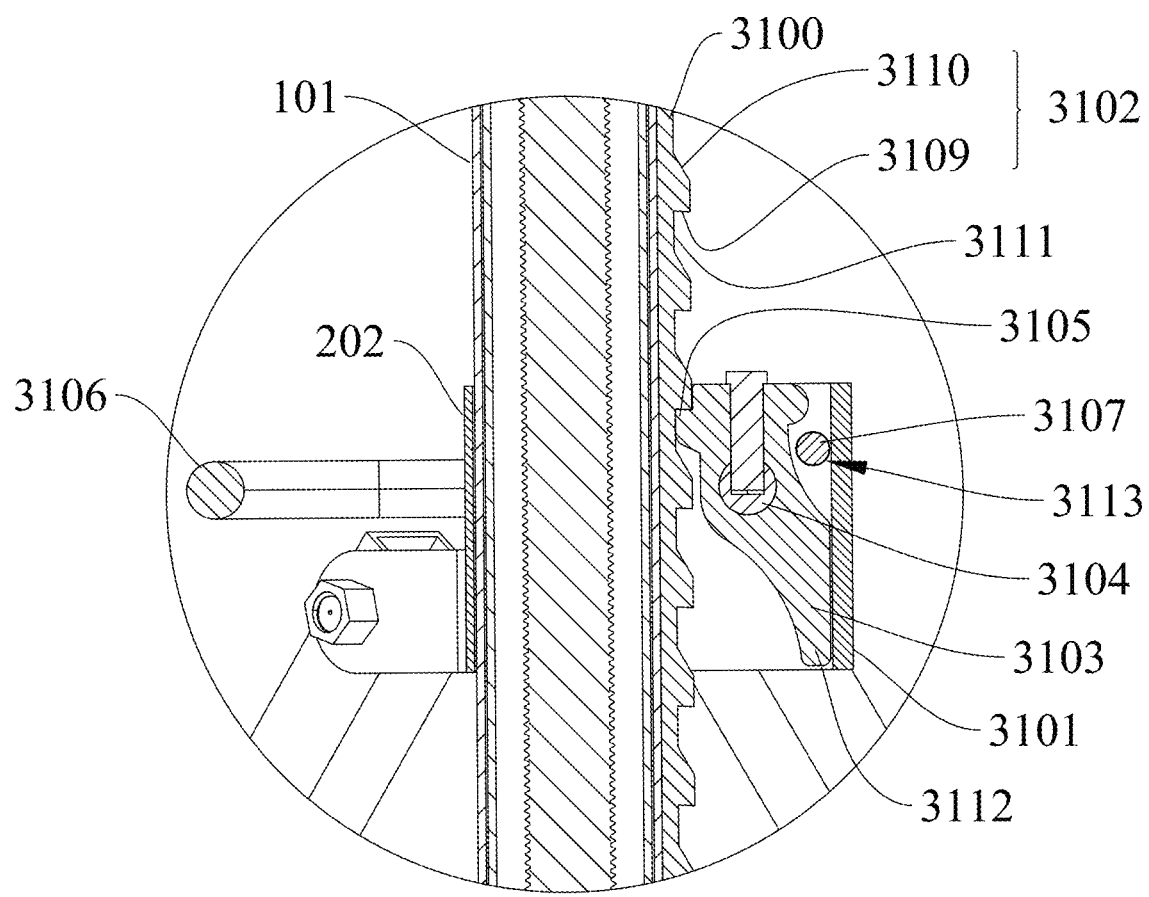
FIGS. 6 to 8 show a partially enlarged perspective view and a perspective view of an adjustment state at B in FIG. 2.
Figure 7:
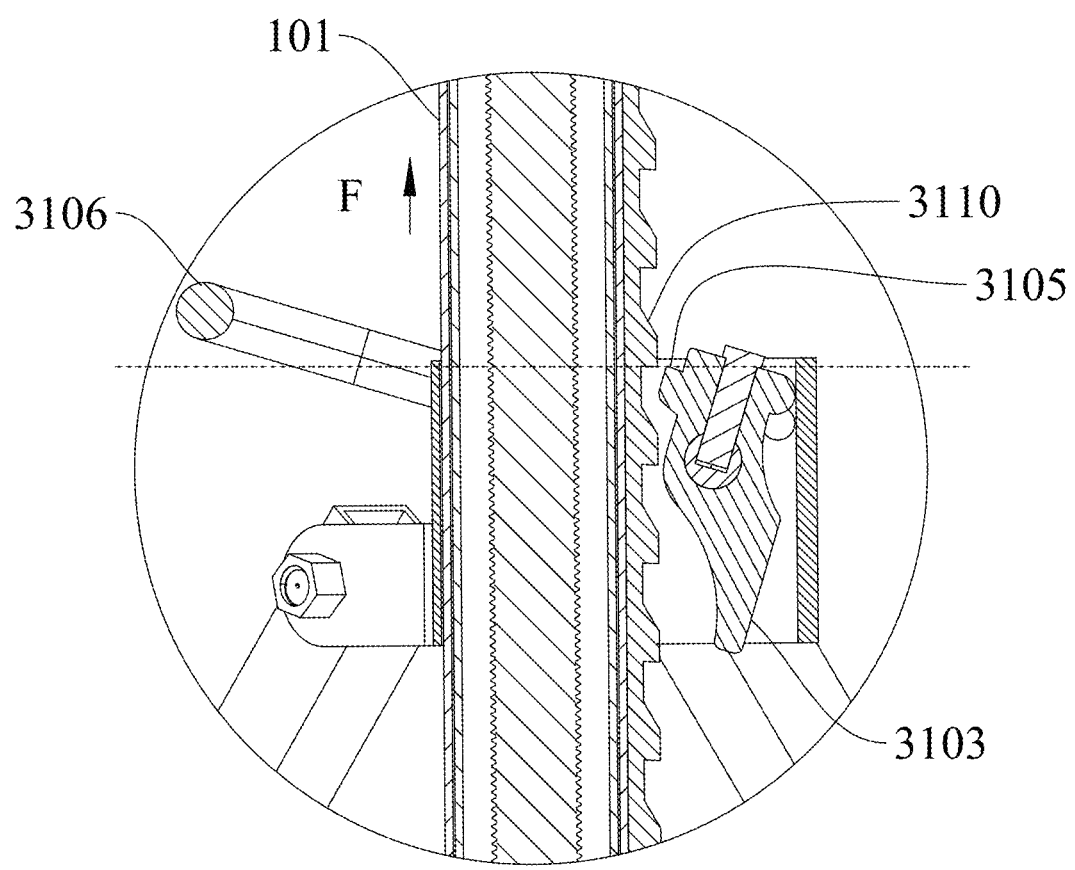
Figure 8:
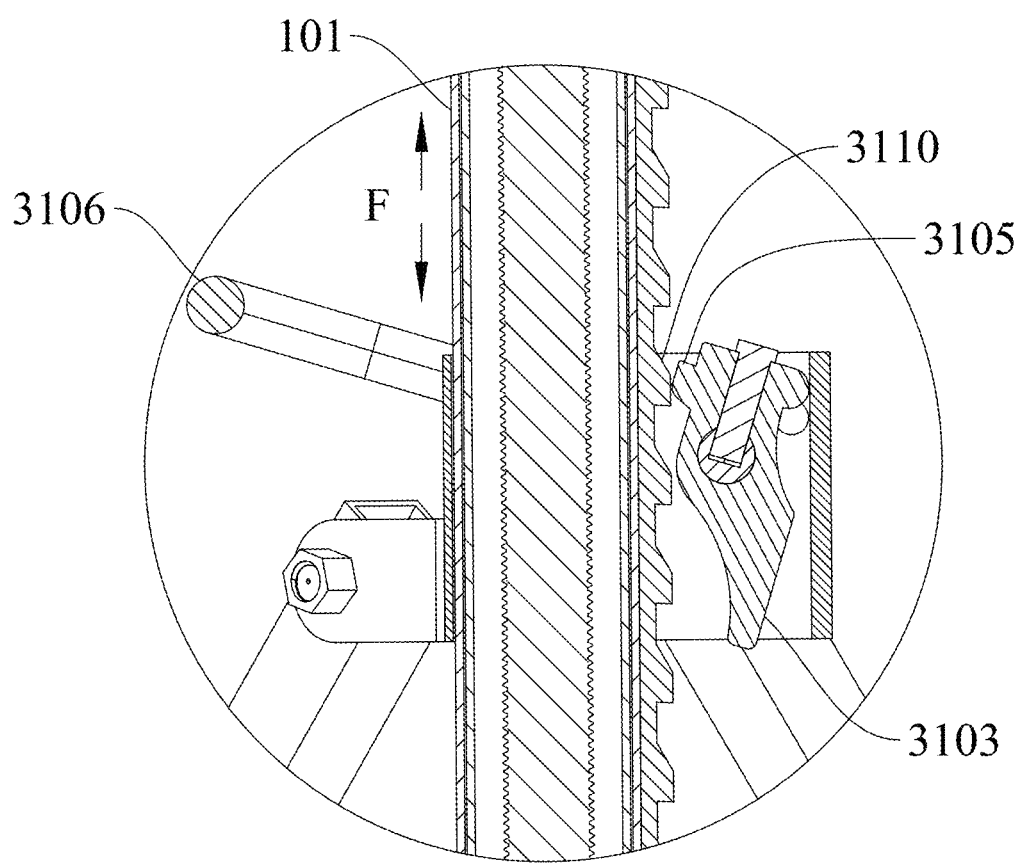

The first locking mechanism 31 enters a locking procedure when the latch 3105 is proximal to the opening 3108 and is abutted against the rack 3100. As shown in FIG. 6, if the latch 3105 and the front sides 3109 of the convex teeth 3102 are abutted against each other and the limit end 3112 and an inner wall of a housing 3201 are abutted against each other, the locking between the outer tube 101 and the casing 202 is realized. As shown in FIG. 8, if the latch 3105 and the front sides 3109 of the convex teeth 3102 are not abutted against each other, the outer tube 101 may be moved in the direction of an arrow of F in the figure so as to form a state as shown in FIG. 7 between the convex teeth 3102 and the latch 3105, and then the latch 3105 further approaches in the direction of the opening 3108 until a state as shown in FIG. 6 is formed. Certainly, it is not necessary to follow the above steps in actual operation, subject to the state as shown in FIG. 6 being realized; alternatively, if the latch 3105 and the front sides 3109 of the convex teeth 3102 are abutted against each other, it can be deemed that locking is completed.

As shown in FIG. 6, the limit end 3112 serves to prevent the latch 3105 from rotating the toggle plate 3103 under the force of the casing 202 moving in the first direction upon the front sides 3109 of the convex teeth 3102 and the latch 3105 being abutted against each other. It is understandable that without the restriction of the limit end 3112, the latch 3105 will rotate around the rotating shaft 3104 under the force in some cases, preventing the first locking mechanism 31 from accomplishing the locking action. However, in some embodiments, as shown in the Figure, with the rotating shaft 3104 as a demarcation point, locking can also be realized when the latch 3105 is abutted against the front sides 3109 of the convex teeth 3102 and against the bottom of the tooth groove 3111 at the same time if the latch 3105 is disposed in the first direction of the rotating shaft 3104. In this embodiment, the limit end 3112 may not be provided.

As shown in FIG. 7, if the first locking mechanism 31 is in a locking state and the stabilizer needs to be unlocked, it is sufficient to trigger the toggle plate 3103 to make the latch 3105 separated from the front sides 3109 of the convex teeth 3102. At this time, as shown in FIG. 8, the height of the stabilizer can be adjusted to conform to the height required for use, or the stabilizer can be fully gathered up for storage. As shown in FIG. 8, when the stabilizer needs to be raised, the outer tube 101 will move in a first direction, and relatively, the casing 202 will move in a second direction. The movement of the casing 202 in the second direction is not limited in this embodiment, and in some aspects, such a solution is more conducive to height adjustment. To allow for smoother movement of the outer tube 101 in the first direction, the back sides 3110 of the convex teeth 3102 are beveled in some embodiments. FIG. 8 may be regarded as a perspective view of another case in which, when the first locking mechanism 31 is in the state as shown in FIG. 6 and the outer tube 101 is moved in the first direction, the toggle plate 3103 passively rotates under the guidance of the tooth groove 3111 and a beveled surface, forming the state as shown in FIG. 8. Certainly, the surface on which the latch 3105 and the beveled surface are abutted against each other can also be designed as a curved surface as shown in the Figure, making the above operation smoother.

Figure 4:
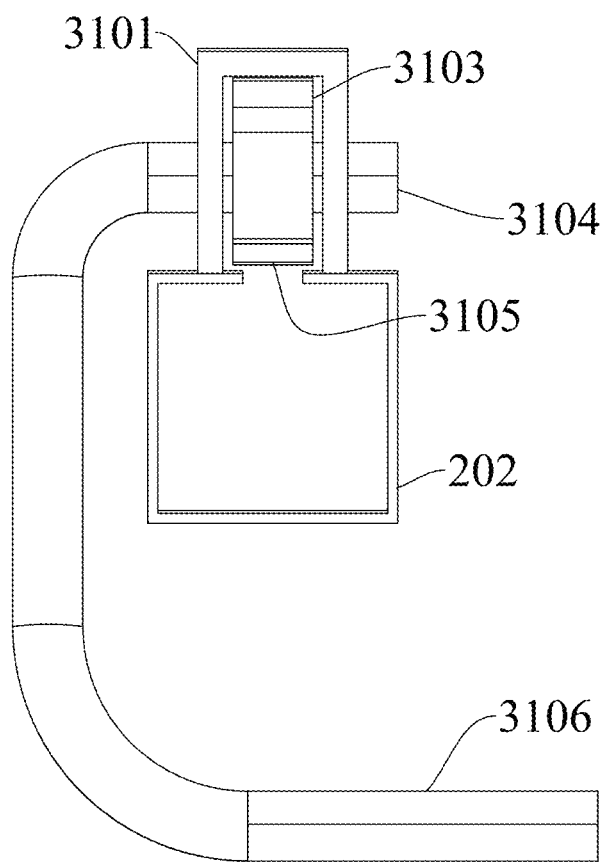
FIG. 4 is a perspective view of a first locking structure according to an embodiment of the present disclosure.
Figure 5:
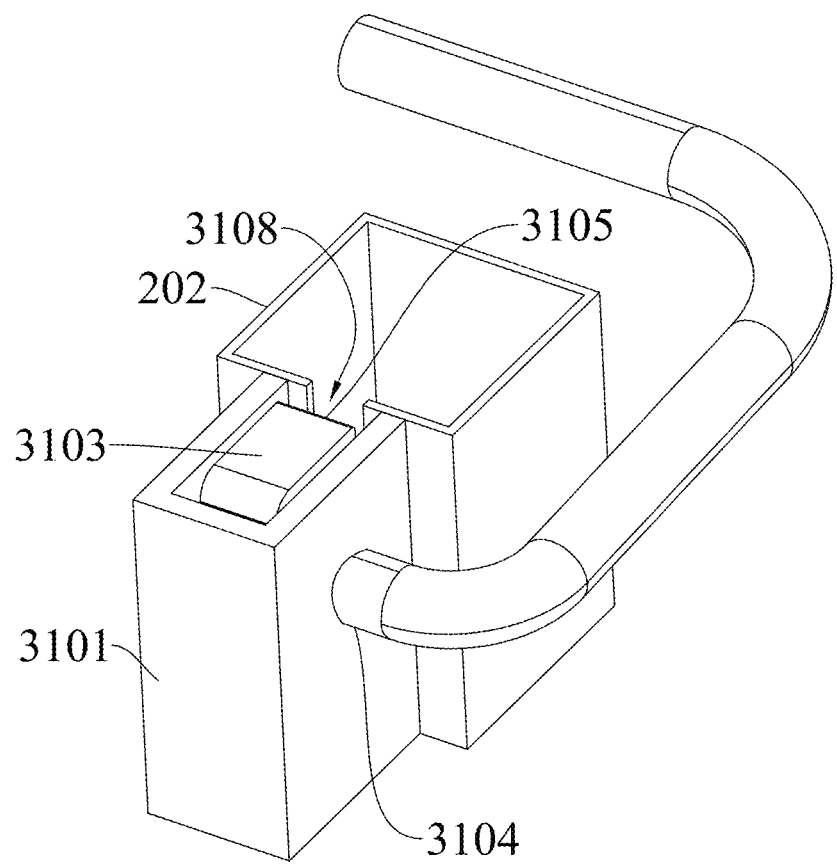
FIG. 5 is another perspective view of the first locking structure according to an embodiment of the present disclosure.

As shown in FIGS. 4 to 6, in some embodiments, the first locking mechanism 31 also includes a handle 3106. The toggle plate 3103 is fixedly connected to the rotating shaft 3104 which is rotationally connected to the housing 3101. One end of the rotating shaft 3104 is connected to a first end of the handle 3106, and a second end of the handle 3106 extends around the casing 202 to the other side of the casing 202. The handle 3106 may facilitate the triggering of the toggle plate 3103, and additionally, may provide the toggle plate 3103 with a rotational force to bring the latch 3105 closer in the direction of the opening 3108, allowing the first locking mechanism 31 to have a self-locking function. The weight of the second end of the handle 3106 may also be increased, which may further improve the self-locking performance.

As shown in FIGS. 3 and 6, in some embodiments, when the first locking mechanism 31 is in a locking state, the first locking mechanism 31 is also provided with a first locking pin 3107, which is selectively inserted on the housing 3101, in order to maintain the current locking state and prevent misoperation that causes the toggle plate 3103 to rotate, resulting in the release of the locking state of the first locking mechanism 31 and the occurrence of an accident. As shown in the Figures, the first locking pin 3107 and the latch 3105 are both provided on one side of the rotating shaft 3104 in the first direction but are separately disposed in opposite directions of the toggle plate 3103 in this embodiment. The housing 3101 is provided with a first pin hole 3113 into which the first locking pin 3107 can be inserted. Rotation of the toggle plate 3103 in the unlocking direction is limited by the first locking pin 3107, so that the locking state of the first locking mechanism 31 is maintained.

Figure 9:
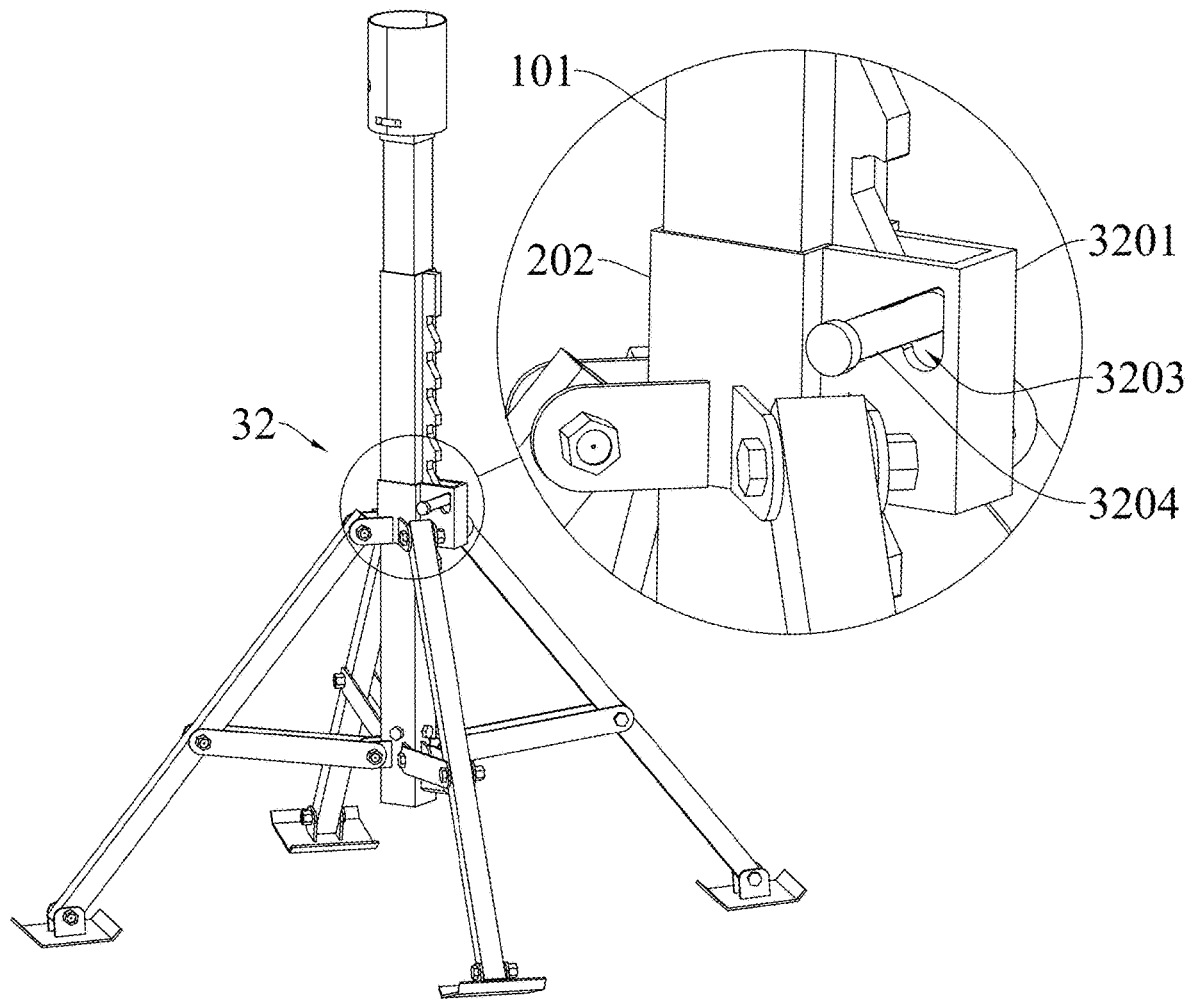
FIG. 9 is a second locking structure and a partially enlarged perspective view according to an embodiment of the present disclosure.
Figure 10:
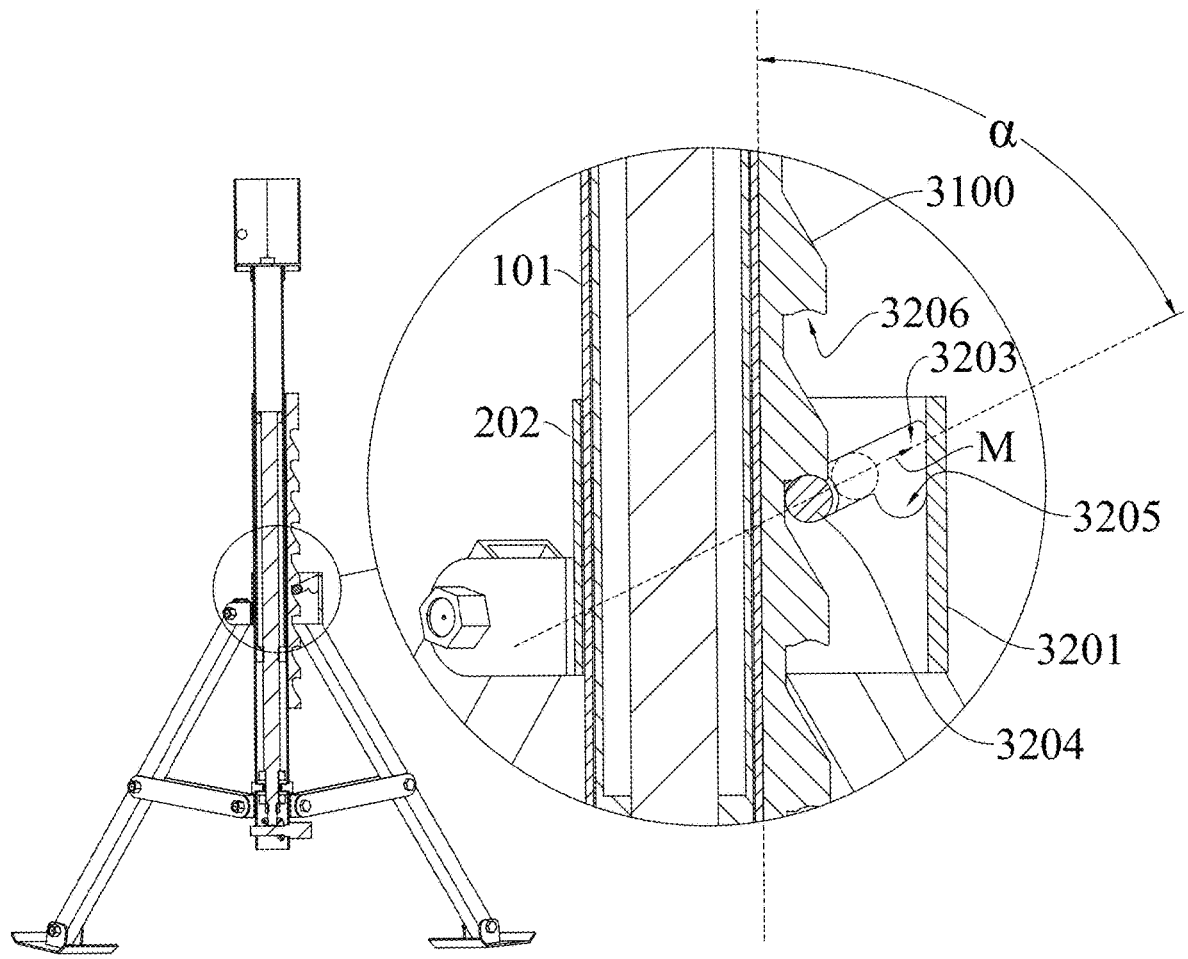
FIG. 10 is a sectional view and a partially enlarged perspective view of the second locking structure according to an embodiment of the present disclosure.

As shown in FIGS. 9 and 10, the present disclosure discloses a second locking mechanism 32 including the structure and the connecting relationship of the rack 3100, the outer tube 101, and the casing 202. The outer wall of the casing 202 is fixedly provided with the housing 3201 which is provided with a cavity, and the opening 3108 of the casing 202 is in communication with the cavity of the housing 3201. The housing 3201 disposed on both sides of the rack 3100 is provided with a strip hole 3203, of which a first end faces one side of the casing 202, and a second end extends along the side facing away from the casing 202. The second locking mechanism 32 also includes a second locking pin 3204 which can move within the strip hole 3203 in a length direction of the strip hole 3203. When the second locking pin 3204 is located at the first end of the strip hole 3203, the front sides 3109 of the convex teeth 3102 and one side of the second locking pin 3204 in the first direction may be abutted against each other, so as to lock the degree of freedom of the casing 202 in the first direction. The length of the strip hole 3203 is needed to ensure that when the second locking pin 3204 is located at the second end of the strip hole 3203, the rack 3100 does not come into contact with the second locking pin 3204 during the height adjustment of the stabilizer.

As shown in FIG. 10, the second end of the strip hole 3203 is provided with a notch 3205 that is defined in the second direction in some embodiments. The notch 3205 may accommodate at least part of the second locking pin 3204. The second locking pin 3204 may be placed in the notch 3205 after moving within the strip hole 3203 to the second end of the strip hole 3203. At this point, the second locking pin 3204 will not interfere with the height adjustment of the stabilizer. In addition, an included angle between the length direction of the strip hole 3203 and the length direction of the outer tube 101 in the first direction is an acute angle α in other embodiments, such that the strip hole 3203 has a slope. The second direction is generally towards the ground, and therefore, after the second locking pin 3204 moves in a direction M in the figure, a partial force that is directed along a side wall of the strip hole 3203 towards the first end of the strip hole 3203 is generated by the second locking pin 3204 under the effect of gravity. The partial force may cause the second locking pin 3204 to actively approach the rack 3100 to provide the second locking mechanism 32 with a self-locking function. In addition, the front sides 3109 of the convex teeth 3102 are provided with inwardly recessed limit slots 3206 in some embodiments. The limit slots 3206 can accommodate at least part of the second locking pin 3204. The limit slots 3206 and the second locking pin 3204 are snap-fitted with each other when the second locking pin 3204 and the front sides 3109 of the convex teeth 3102 are abutted against each other.

Figure 11:
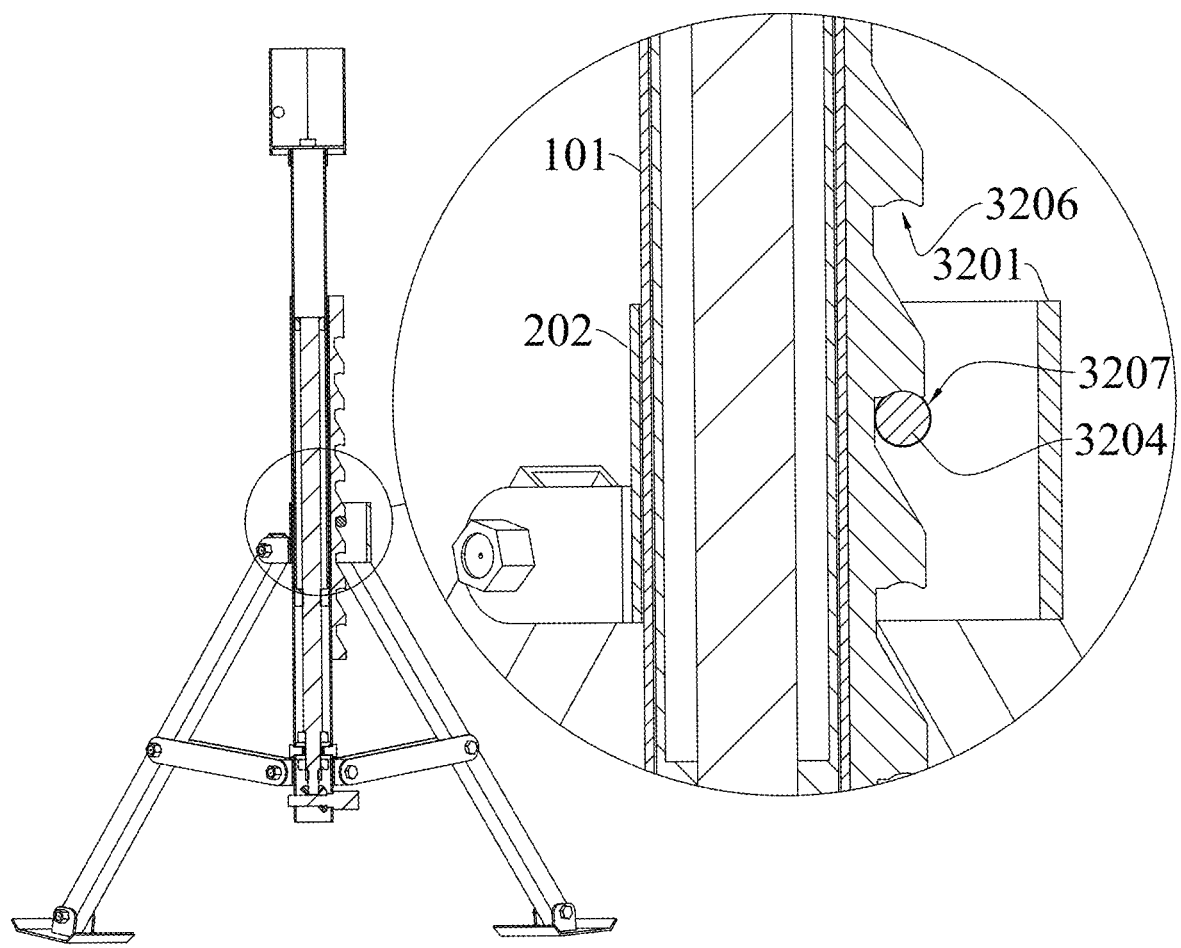
FIG. 11 is a second schematic structural diagram of the second locking structure according to an embodiment of the present disclosure.

Secondly, the second locking mechanism 32 may also be somewhat simplified. Referring to FIG. 11, the strip hole 3203 may be replaced with a second pin hole 3207 in some embodiments. The second pin hole 3207 is disposed at the first end of the strip hole 3203, is in clearance fit with the second locking pin 3204, and is selectively inserted into the second pin hole 3207 so as to lock the degree of freedom of the casing 202 in the first direction. In addition, the aperture of the second pin hole 3207 is equal to or slightly greater than the outer diameter of the second locking pin 3204, and the second locking pin 3204 is less movable within the second pin hole 3207. As a result, the degree of freedom of the casing 202 in the second direction is also locked.

Figure 12:
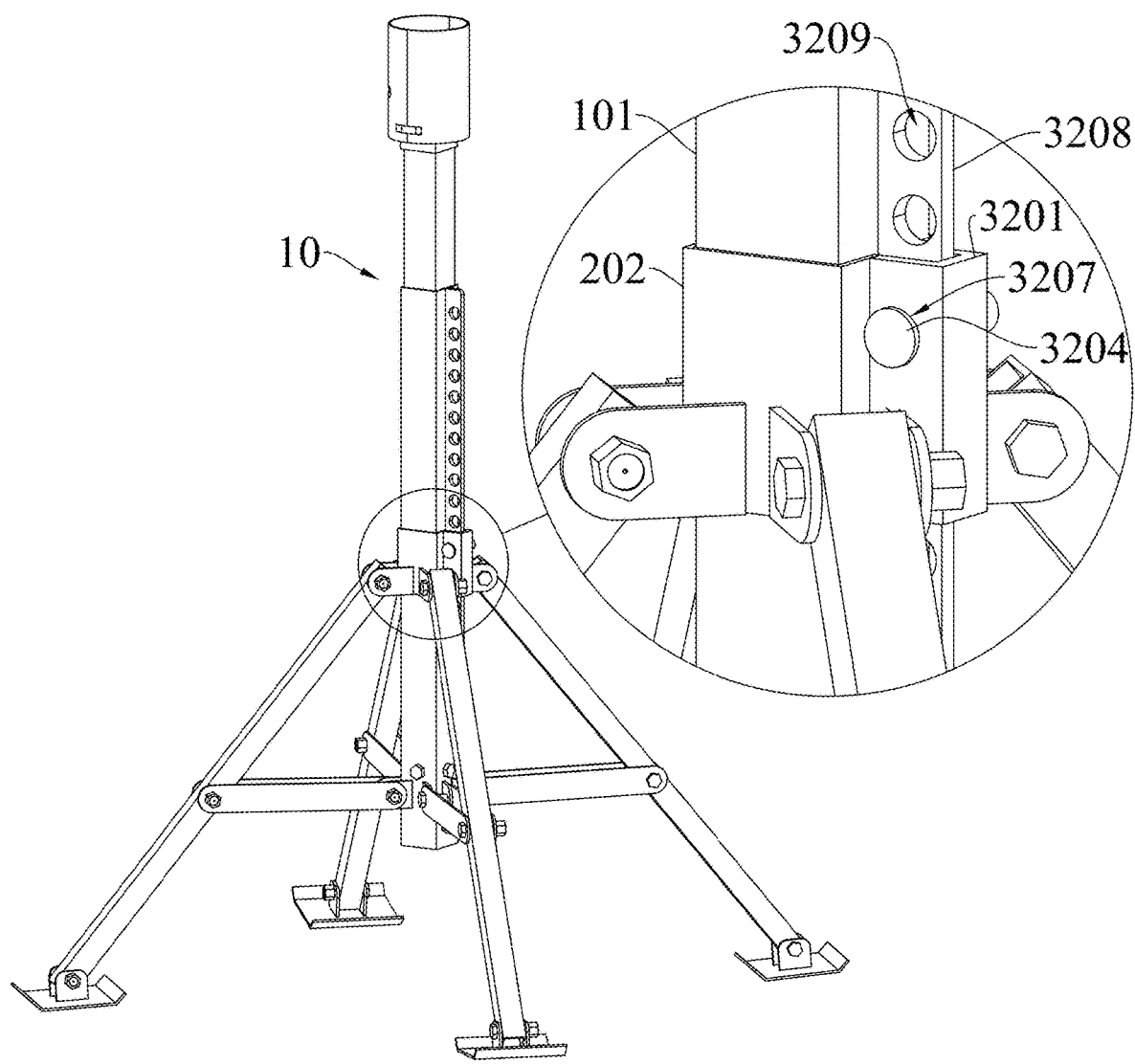
FIGS. 12 and 13 show a third schematic structural diagram, a partially enlarged perspective view, and a sectional view of the second locking structure according to an embodiment of the present disclosure.
Figure 13:
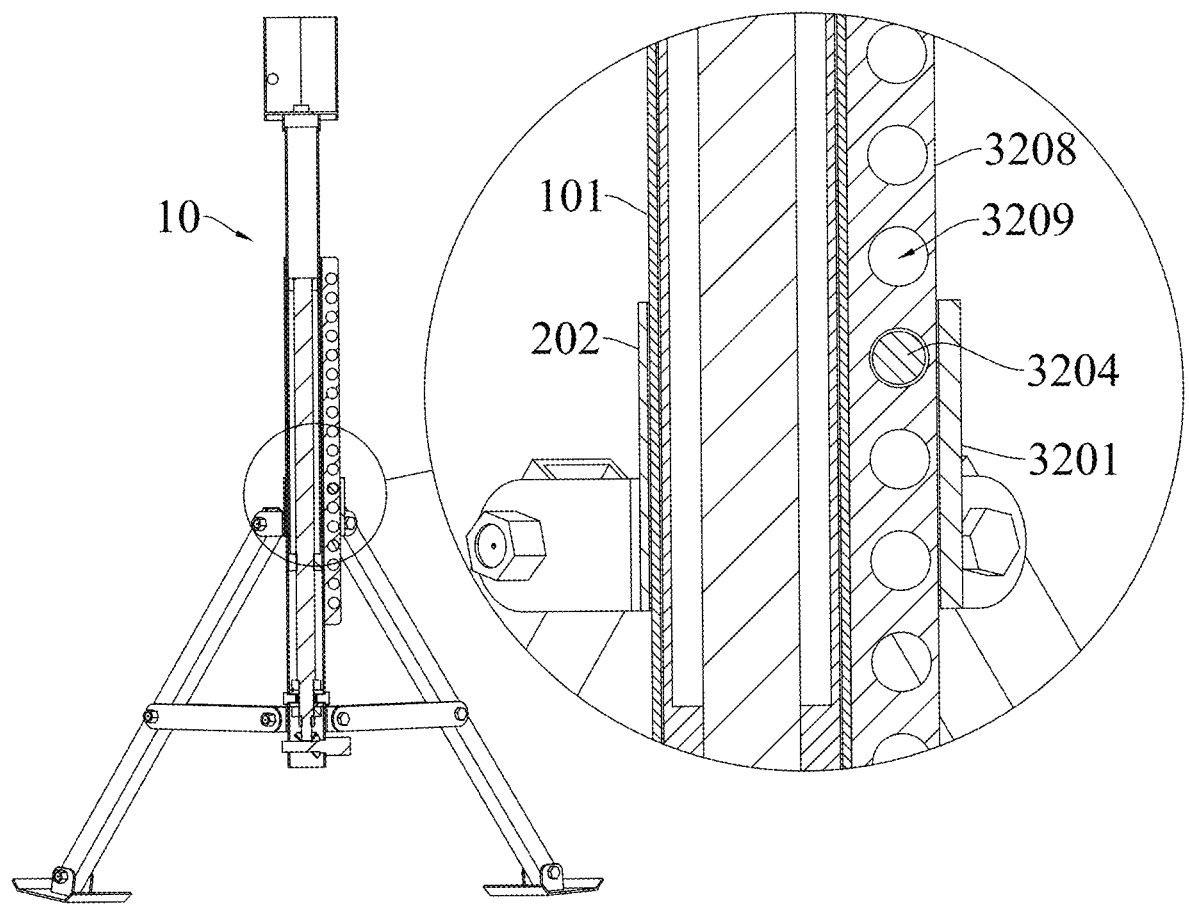

In addition, the rack 3100 of the second locking mechanism 32 may be replaced with a limit plate 3208 as shown in FIGS. 12 and 13 on the basis of the implementation shown in FIG. 11 in some embodiments. The limit plate 3208 is provided with several limit holes 3209 which are distributed in a length direction of the limit plate 3208. The second locking pin 3204 is selectively inserted into the limit holes 3209 so as to limit the degree of freedom of the casing 202 in the first direction and the second direction.

Figure 14:
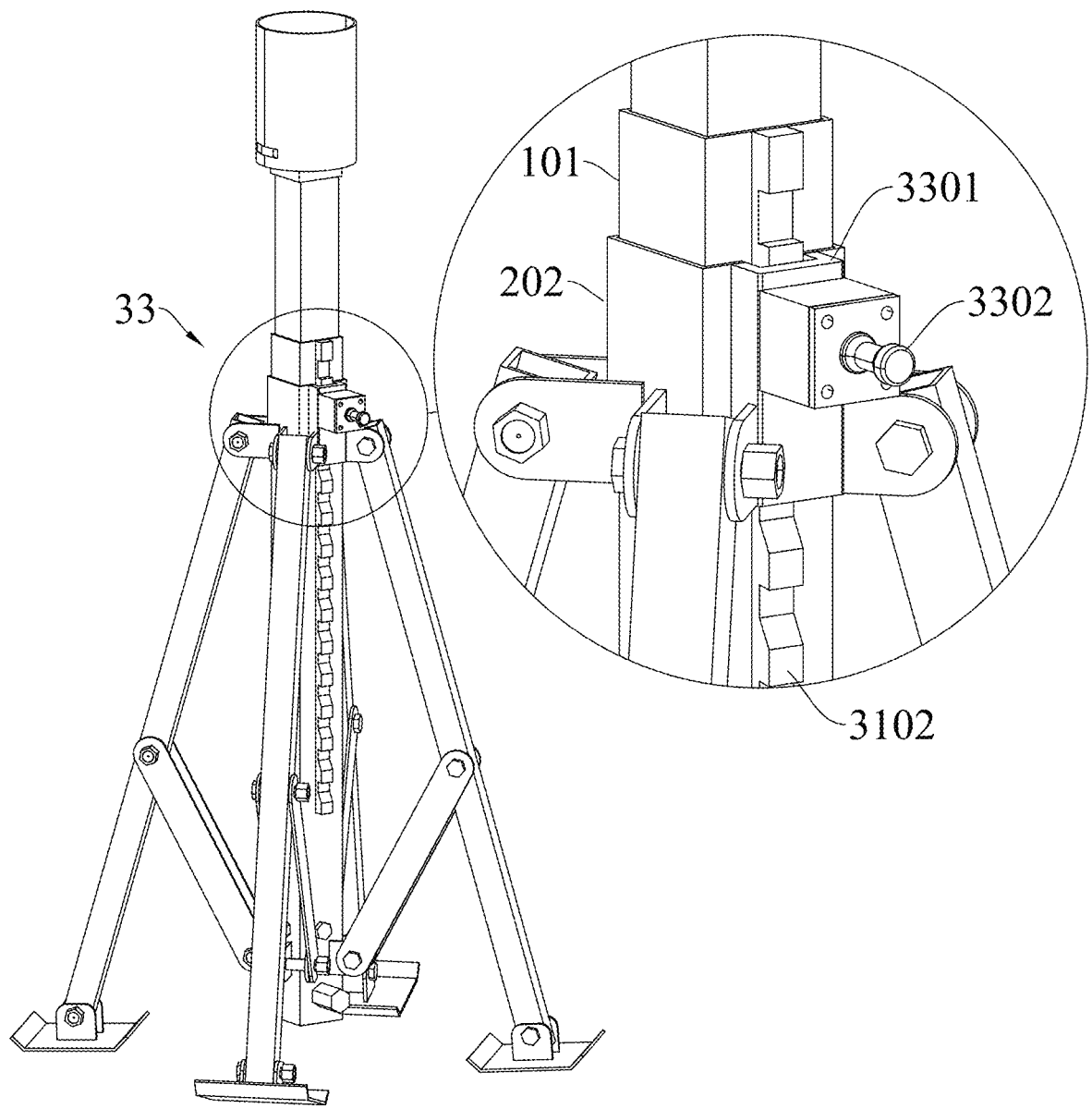
FIG. 14 is a third locking structure and a partially enlarged perspective view according to an embodiment of the present disclosure.
Figure 15:
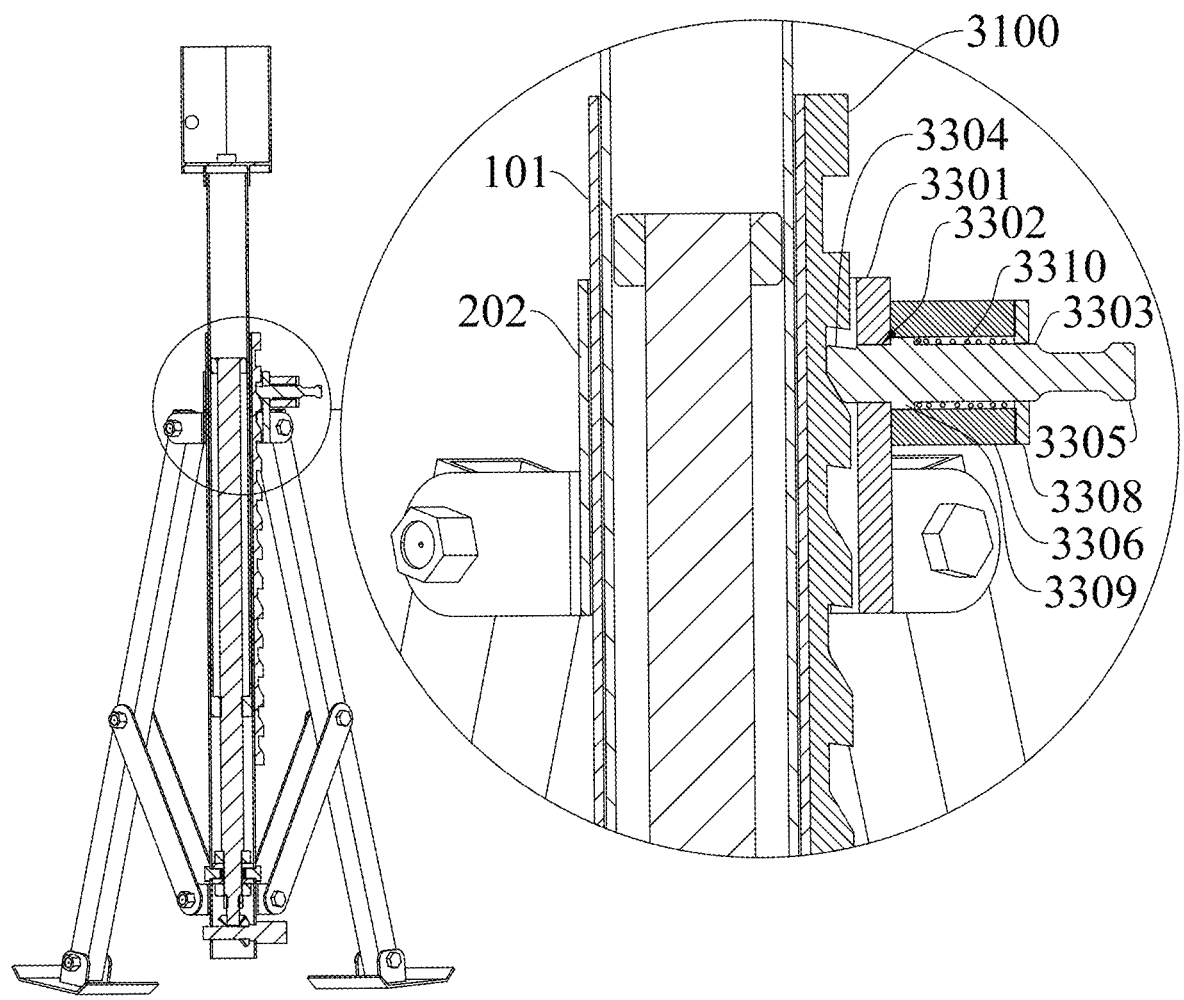
FIG. 15 shows a sectional view and a partially enlarged perspective view of the third locking structure according to an embodiment of the present disclosure.
Figure 16:
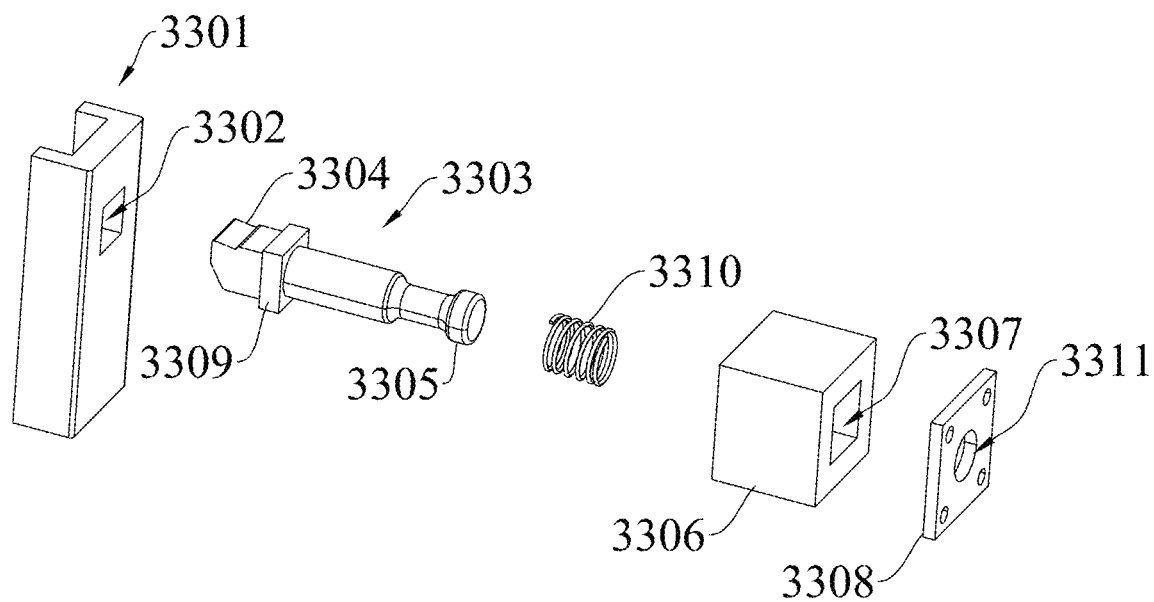
FIG. 16 is a partial structural exploded view of the third locking structure according to an embodiment of the present disclosure.

As shown in FIGS. 14 to 16, the present disclosure discloses a third locking mechanism 33 including the structure and the connecting relationship of the rack 3100, the outer tube 101, and the casing 202. The third locking mechanism 33 also includes a first housing 3301 and a second housing 3306. The first housing 3301 is fixedly provided on the outer wall of the casing 202 and is provided with a cavity. The first housing 3301 is provided with a third pin hole 3302 in a side wall. The opening 3108 of the casing 202 is interconnected to the cavity and the third pin hole 3302 of the first housing 3301. The second housing 3306 is provided with a channel 3307. A first end of the second housing 3306 is connected to an outer wall of the first housing 3301, and the third pin hole 3302 is in communication with the channel 3307. A cover 3308 is provided at a second end of the second housing 3306, and a fourth pin hole 3311 is defined in the cover 3308. The third locking mechanism 33 also includes a third locking pin 3303. The third locking pin 3303 includes a latch 3304 and a handle 3305 that are separately disposed at both ends thereof. The third locking pin 3303 is inserted into the channel 3307 of the second housing 3306. The latch 3304 of the third locking pin 3303 faces the third pin hole 3302, and the handle 3305 of the third locking pin 3303 extends out from the fourth pin hole 3311 of the cover 3308. The latch 3304 of the third locking pin 3303 selectively extends into the third pin hole 3302 and is abutted against the front sides 3109 of the convex teeth 3102, so as to limit the degree of freedom of the casing 202 in the first direction.

In addition, the third locking pin 3303 is provided with an outwardly projecting limit ring 3309 that is disposed on one side proximal to the latch 3304 in some embodiments. A spring 3310 is sleeved to the outer side of the third locking pin 3303, with one end of the spring 3310 abutted against the limit ring 3309 and the other end abutted against an inner wall of the cover 3308. The spring 3310 may provide the third locking pin 3303 with a force toward the rack 3100, allowing the third locking mechanism 33 to have a self-locking function.

Figure 17:
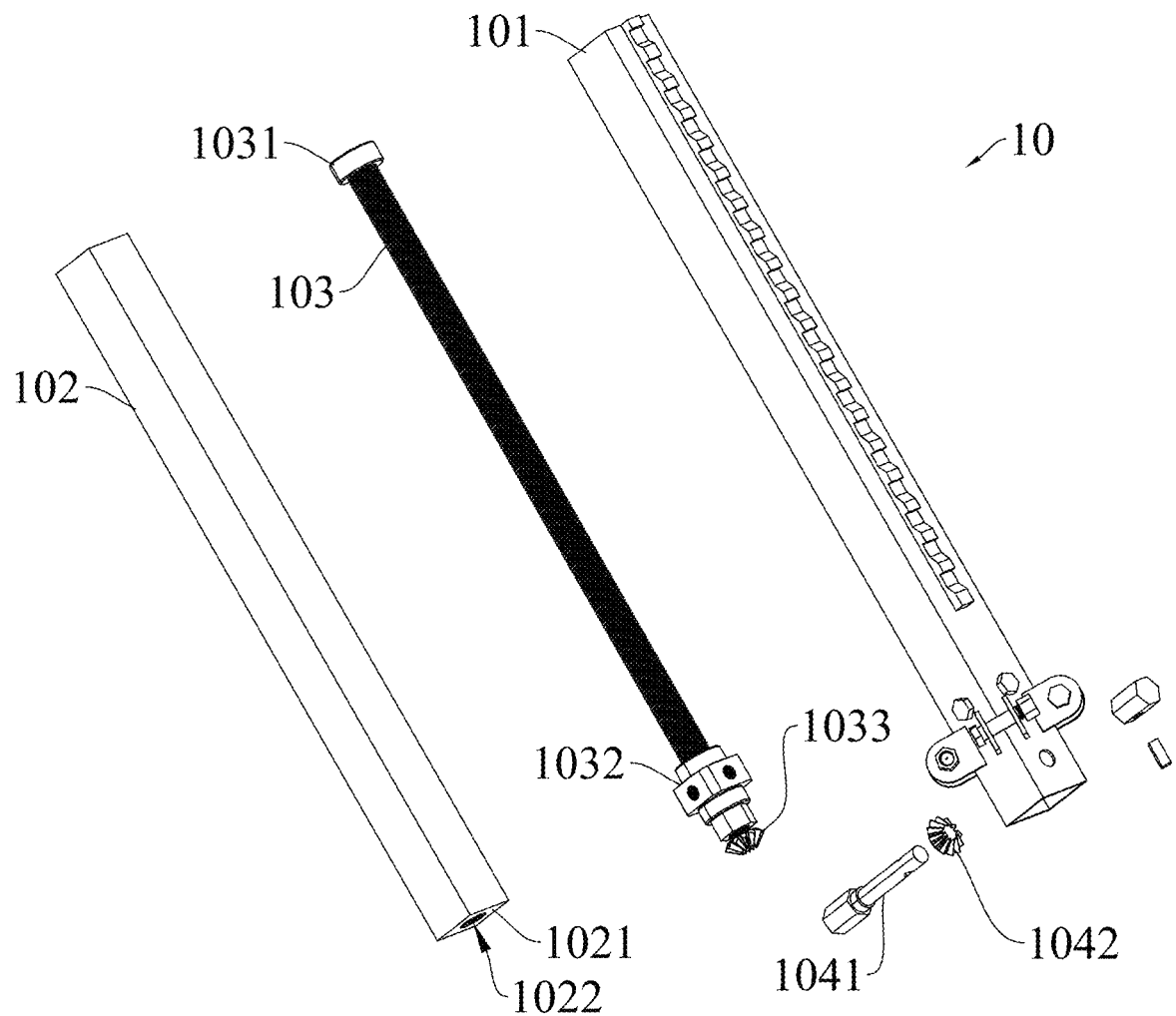
FIG. 17 is an exploded view of a second support structure according to an embodiment of the present disclosure.
Figure 19:
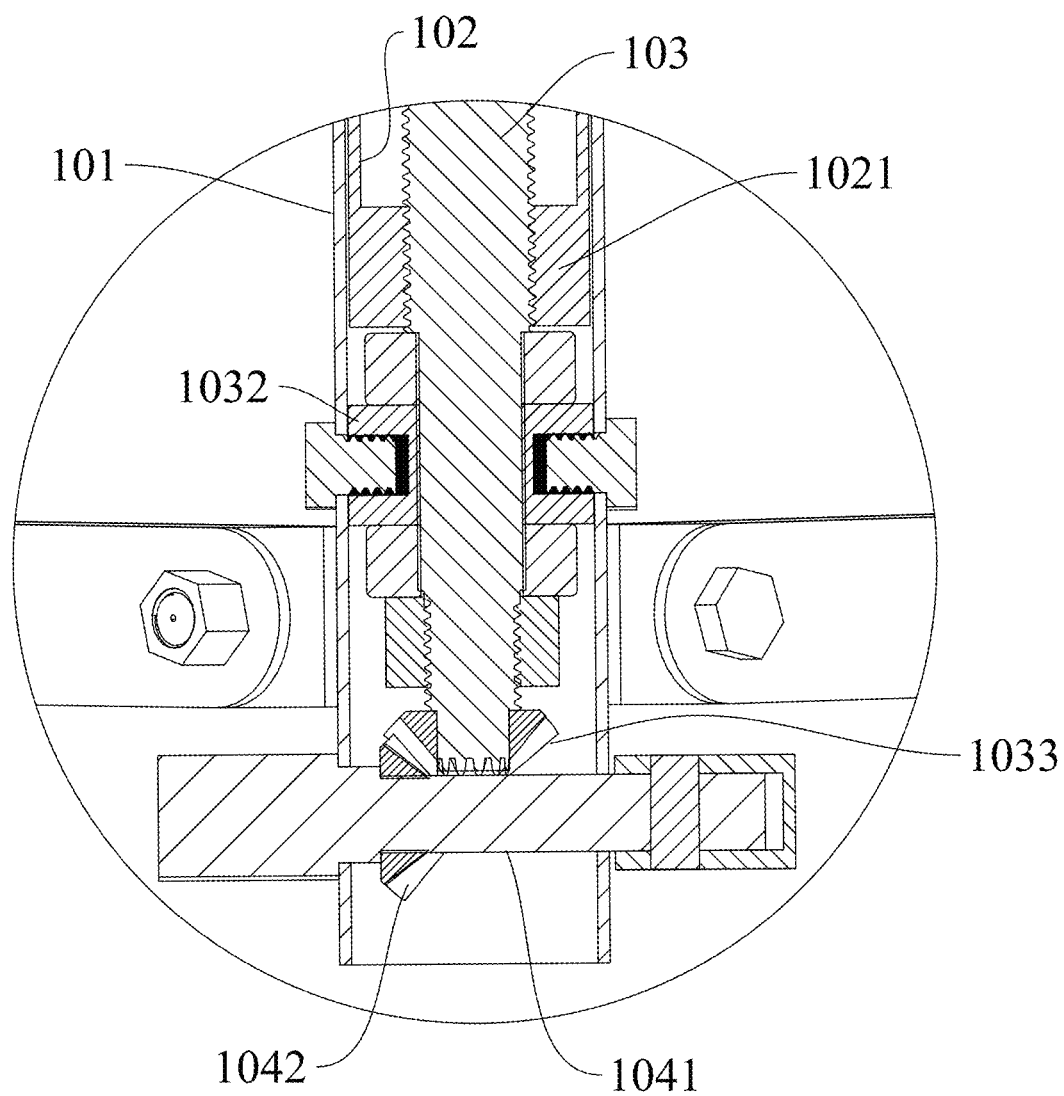
FIG. 19 is a partially enlarged perspective view at D in FIG. 2.

As shown in FIGS. 2, 17, and 19, the first support structure 10 also includes an inner tube 102 which is sleeved to an inner side of the outer tube 101 and slidably connected to the outer tube 101 in some embodiments. The inner tube 102 may extend out from the first end of the outer tube 101 or contract into the outer tube 101 under the action of a driver. In some embodiments, the driver includes a threaded rod 103 and a slider 1021, where the slider 1021 is provided with internal threads and is in threaded fit and connection with the threaded rod 103. The inner tube 102 has a first end facing the first direction and a second end facing the second direction, and the slider 1021 is disposed at the second end of the inner tube 102 and is fixedly connected to the inner wall of the inner tube 102. The threaded rod 103 has a first end facing the first direction and a second end facing the second direction, and the second end of the threaded rod 103 is rotationally sleeved with a fixing block 1032 which is fixedly connected to the inner wall of the outer tube 101. Rotating the threaded rod 103 can drive the inner tube 102 to slide within the outer tube 101 in its length direction. In some embodiments, a first gear 1033 is provided at the second end of the threaded rod 103, and a drive shaft 1041 is provided at the second end of the outer tube 101, with the drive shaft 1041 running through and rotationally connected to the outer tube 101. The drive shaft 1041 is sleeved with a second gear 1042. The first gear 1033 and the second gear 1042 are both beveled gears and are connected in a meshed manner. When in use, the drive shaft 1041 can be rotated to drive the threaded rod 103 to rotate, so that the inner tube 102 slides along the inner wall of the outer tube 101.

Figure 18:
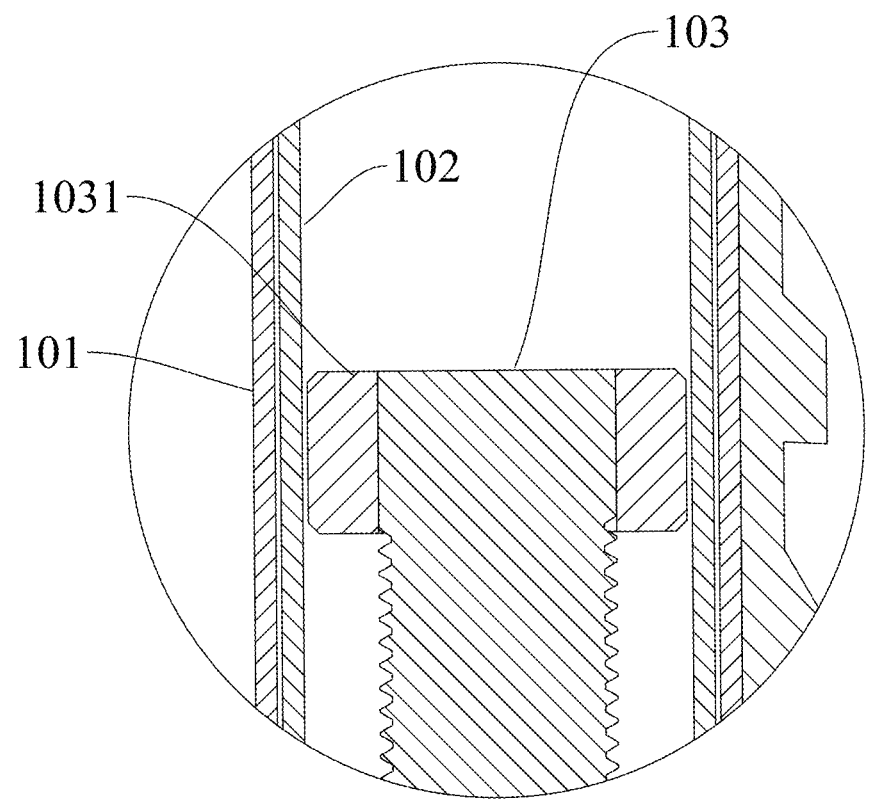
FIG. 18 is a partially enlarged perspective view at C in FIG. 2.

As shown in FIGS. 2 and 18, in some embodiments, a limit block 1031 is provided at the first end of the threaded rod 103, with the limit block 1031 slidably connected to the inner wall of the inner tube 102. The limit block 1031 can be used to improve the stability of the first support structure 10 during extension and contraction, and can also be used to limit the maximum length of the inner tube 102 that extends out.

Figure 20:
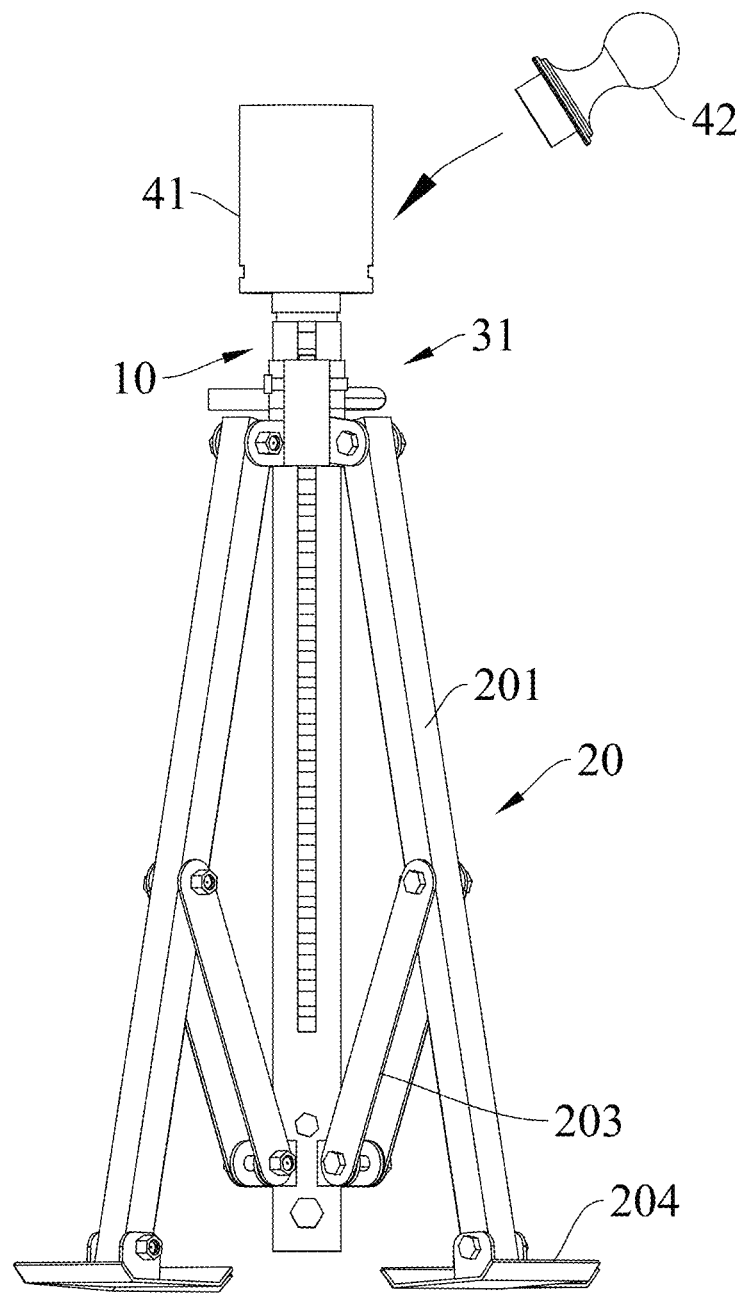
FIG. 20 shows a perspective view of the stabilizer in a contracted state and a perspective view of a replaceable connecting member according to an embodiment of the present disclosure.
Figure 21:
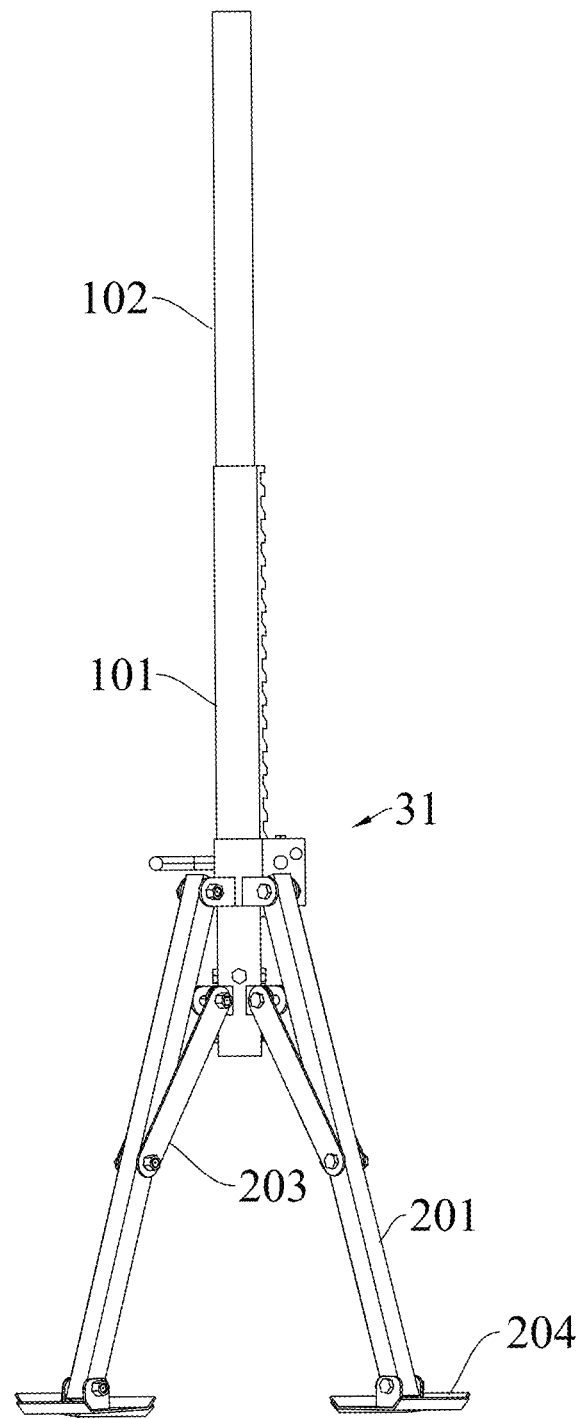
FIG. 21 is a perspective view of the stabilizer in an extended state according to an embodiment of the present disclosure.

As shown in FIG. 20, connecting members are selectively mounted at the first end of the first support structure 10 in order to improve the compatibility of the stabilizer in some embodiments. The connecting members include a first connecting member 41, which is of a tubular structure with an opening 3108 at the top. The connecting members also include a second connecting member 42, which has a ball head structure at the top. Certainly, the connecting members may also be designed in other shapes or structures. When in use, corresponding connecting members can simply be replaced as needed. Certainly, the stabilizer can also be used directly without connecting members in some cases.

The above-mentioned embodiments are merely some embodiments of the present disclosure and are not intended to limit the present disclosure. For those skilled in the art, various changes and variations may be made to the present disclosure. Any modifications, equivalent substitutions, improvements, etc. made within the spirit and principles of the present disclosure shall be included in the scope of protection of the present disclosure.

The invention claimed is:
1. A stabilizer for a recreational vehicle, comprising:
a first support structure, a second support structure, and a locking mechanism, wherein
the first support structure comprises an outer tube;
the second support structure comprises:
a casing, slidably sleeved to an outer side of the outer tube;

at least three side support bars, a first end of each of the at least three side support bars being hinged with an outer wall of the casing respectively; and at least three connecting rods, one end of each of the at least three connecting rods being hinged with a second end of the outer tube, and another end of each of the at least three connecting rods being hinged with the side support bars;

wherein the casing selectively moves in a first direction of a first end of the outer tube or in a second direction of the second end of the outer tube, so as to adjust a height of the stabilizer; and the locking mechanism comprises:
a first limit member, fixedly provided on an outer wall of the outer tube in a longitudinal direction of the outer tube;
a housing, fixedly connected to the outer wall of the casing; and
a second limit member, confined to and movably connected to the housing;

wherein the second limit member is selectively abutted against the first limit member, so as to lock a degree of freedom of the casing in the first direction;

the first support structure further comprises an inner tube, the inner tube is sleeved within the outer tube and slidably connected to an inner wall of the outer tube, and the inner tube is extendable or retractable in the first direction of the outer tube under an action of a driver;

the driver comprises a threaded rod and a slider, the threaded rod is rotationally fixedly connected to the outer tube; the slider is provided with a threaded hole, the slider is in threaded connection with the threaded rod and fixedly connected to the inner tube;

the threaded rod has a first end facing the first direction and a second end facing the second direction, and the second end of the threaded rod is rotationally sleeved with a fixing block which is fixedly connected to the inner wall of the outer tube; the second end of the threaded rod is provided with a first gear, the fixing block is sandwiched between the slider and the first gear, rotation of the threaded rod is capable of driving the inner tube to move in its longitudinal direction.

2. The stabilizer according to claim 1, wherein:
the first limit member is of a strip structure provided with several limit points that are distributed in a longitudinal direction of the first limit member;
a wall of the casing is provided with an opening which is defined in a longitudinal direction of the outer tube and the first limit member is extendable into the opening and movable in its said longitudinal direction; and
the second limit member is selectively abutted against the limit points.

3. The stabilizer according to claim 2, wherein:
the limit points comprise convex teeth having front sides facing the second direction and back sides facing the first direction;
the second limit member comprises a toggle plate which is rotationally connected to the housing by means of a rotating shaft, and the toggle plate comprises a first latch facing the opening of the casing; and
the toggle plate is driven to rotate so that the first latch selectively comes proximal to the first limit member and is abutted against the front sides of the convex teeth.

4. The stabilizer according to claim 3, wherein:
the back sides are beveled, and the back sides guide and drive the toggle plate to rotate when the casing moves in the second direction on the outer tube.

5. The stabilizer according to claim 3, wherein:
the toggle plate is fixedly connected to the rotating shaft, the rotating shaft is rotationally connected to the housing, one end of the rotating shaft is provided with a handle and is connected to a first end of the handle, and a second end of the handle extends around the casing to another side of the casing.

6. The stabilizer according to claim 3, wherein:
the housing is selectively provided with a first locking pin in an insertion mode, the first locking pin being configured to limit the rotation of the toggle plate in an unlocking direction, so as to maintain the first latch in a state of being abutted against the convex teeth.

7. The stabilizer according to claim 2, wherein:
the limit points comprise convex teeth having front sides facing the second direction and back sides facing the first direction;
the housing disposed on both sides of the first limit member is provided with a strip hole, with a first end facing one side of the casing and a second end extending along another side facing away from the casing;
the second limit member comprises a second locking pin which is movable in a longitudinal direction of the strip hole, and when the second locking pin is located at the first end of the strip hole, the front sides of the convex teeth are abutted against the second locking pin, so as to lock the degree of freedom of the casing in the first direction.

8. The stabilizer according to claim 7, wherein:
the second end of the strip hole is provided with a notch that is defined in the second direction, the notch being capable of accommodating at least a part of the second locking pin.

9. The stabilizer according to claim 7, wherein:
an included angle between the longitudinal direction of the strip hole and the longitudinal direction of the outer tube in the first direction is an acute angle.

10. The stabilizer according to claim 7, wherein:
the front sides of the convex teeth are provided with inwardly recessed limit slots, the limit slots being capable of accommodating at least a part of the second locking pin.

11. The stabilizer according to claim 2, wherein:
the housing is provided with a first pin hole in a first side wall;
the second limit member comprises a third locking pin which selectively passes through the first pin hole and is abutted against the limit points, so as to lock the degree of freedom of the casing in the first direction.

12. The stabilizer according to claim 11, wherein:
the limit points comprise limit holes.

13. The stabilizer according to claim 11, wherein:
the limit points comprise convex teeth having front sides facing the second direction and back sides facing the first direction.

14. The stabilizer according to claim 13, wherein:
the housing comprises a first housing and a second housing, the first housing is fixedly connected to the outer wall of the casing, the first pin hole is formed in the first housing; the second housing is fixedly connected to an outer wall of the first casing, and is provided with a second pin hole in a second side wall;
the third locking pin comprises a latch and a handle that separately disposed at both ends of the third locking pin, and the third locking pin is movable along a channel formed by the first pin hole and the second pin hole, the latch of the third locking pin selectively passes through the first pin hole and is abutted against the front sides of the convex teeth.

15. The stabilizer according to claim 14, wherein:
the third locking pin is provided with an outwardly projecting limit ring, and a spring is sleeved to an outer side of the third locking pin, the spring having one end abutted against the limit ring and another end abutted against the second side wall and being configured to provide elasticity to the third locking pin toward the first pin hole.

16. The stabilizer according to claim 1, wherein:
the driver further comprises a drive shaft which penetrates through the outer tube and is rotationally connected to the outer tube, a second gear is sleeved to the drive shaft, and the first gear and the second gear are connected in a meshed manner.

17. The stabilizer according to claim 1, wherein:
the threaded rod is provided with a limit block at one end facing the first direction, the limit block being slidably connected to the inner wall of the inner tube.

18. The stabilizer according to claim 1, wherein:
the first support structure is selectively provided with a connecting member at one end facing the first direction.

* * * * *